United States Patent [19]

Miyauchi et al.

[11] Patent Number: 5,579,468
[45] Date of Patent: Nov. 26, 1996

[54] INFORMATION PROCESSING UNIT HAVING FUNCTION MODULES INDEPENDENTLY RECOGNIZING USER INFORMATION

[75] Inventors: Hisao Miyauchi; Hirosi Iizuka; Takashi Kayamori; Toshiro Watanabe; Norikazu Saito; Yutaka Hidai; Katsumi Kunihara; Masajiro Fukunaga; Satoshi Yoshizawa; Makoto Hirose; Tadashi Hoshiai; Tetsuya Yoshimura; Nobuo Asahi, all of Tokyo, Japan

[73] Assignee: Institute for Personalized Information Environment, Tokyo, Japan

[21] Appl. No.: 397,727

[22] Filed: Mar. 2, 1995

Related U.S. Application Data

[63] Continuation of Ser. No. 123,035, Sep. 20, 1993, abandoned, which is a continuation of Ser. No. 567,879, Aug. 15, 1990, abandoned.

[30] Foreign Application Priority Data

Aug. 29, 1989 [JP] Japan ................................. 1-222498

[51] Int. Cl.$^6$ .......................................... G06F 15/00
[52] U.S. Cl. ................................... 395/326; 395/53
[58] Field of Search ............................ 395/152–161, 395/53

[56] References Cited

U.S. PATENT DOCUMENTS

| | | | |
|---|---|---|---|
| 4,114,190 | 9/1978 | Mazuir | 395/155 |
| 4,688,167 | 8/1987 | Agarwal | 395/158 |
| 4,791,556 | 12/1988 | Vilkaitis | 395/155 |
| 4,797,854 | 1/1989 | Nakazaki et al. | 395/155 |
| 4,866,638 | 9/1989 | Cosentino et al. | 395/155 |
| 5,121,497 | 6/1992 | Kerr et al. | 395/650 |
| 5,287,448 | 2/1994 | Nicol et al. | 395/159 |

OTHER PUBLICATIONS

Fu et al., "A Multi–Processor System for Proloy Processing," Proceedings of the 2nd IEEE Conference on Computer Workstations (1988), pp. 60–69.

Fleisch, B., "Distributed Share Memory in a Loosely Coupled Distributed System", 33rd IEEE Computer Society International Conference (1988) pp. 182–184.

Silverman, "Blackboard System Generator (BSG): An Alternative Distributed Problem Solving Paradigm," IEEE Transactions on Systems, Man, and Cybernetics, vol. 19 No. 2 (Mar./Apr. 1989), pp. 334–355.

Nii, "Blackboard Systems: The Blackboard Model of Problem Solving and the Evelution of Blackboard Architectures," The AI Magazine, vol. 7 No. 2 (Summer 1986) pp. 38–53.

Wang, "Load Sharing in Distributed Systems," IEEE Transactions on Computers, vol. 34 No. 3 (Mar. 1985), pp. 204–217.

(List continued on next page.)

*Primary Examiner*—Heather R. Herndon
*Assistant Examiner*—Joseph R. Burwell
*Attorney, Agent, or Firm*—Armstrong, Westerman, Hattori, McLeland & Naughton

[57] ABSTRACT

An architecture providing a human interface includes a user input device, a studio or workplace receiving an output of the user input device, the studio being capable of storing and sharing information, and a plurality of agents or functional modules connected to supply/receive data from the studio. The agents are connected in parallel and perform processing as distributed and cooperative processing of functions by the user. The agents are independent components having independent functions performing processing on data in the studio to receive and store items of information, respectively, from and to the studio as a shared information medium, the studio being accessible to the user and to the plurality of agents. Each of the plurality of agents can be independently started depending upon a status of the studio.

3 Claims, 3 Drawing Sheets

OTHER PUBLICATIONS

Rubin et al., "OFMspert: Inference of Operator Intentions in Supervisory Control Using a Blackboard Architecture," IEEE Transactions on Systems, Man, and Cybernetics, vol. 18 No. 4 (Jul./Aug. 1988), pp. 618–637.

"Distributed Problem–Solving Techniques: A Survey", IEEE Transactions on Systems, Man, and Cybernetics, vol. SMC–17, No. 5, Sep./Oct. 1987.

"The First Workshop on Blackboard Systems", Rajendra Dodhiawala, Vasudevan Jagannathan, Larry aum, and Tom Skillman, AI Magazine, Spring 1989.

5,579,468

INFORMATION PROCESSING UNIT HAVING FUNCTION MODULES INDEPENDENTLY RECOGNIZING USER INFORMATION

This application is a continuation U.S. patent application Ser. No. 08/123,035 filed Sep. 20, 1993, abandoned, which is a continuation U.S. patent application Ser. No. 07/567,879, filed Aug. 15, 1990, now abandoned.

BACKGROUND OF THE INVENTION

The present invention relates to an architecture model of a human interface to attain the purpose of the user through dispersion and coordination of functions by the user and the group of agents.

In the past, the principal purpose of a computer was to process a large quantity of data at high speed. Thus, in the development of a computer, importance has been placed on the processing efficiency and the throughput of the computer. Also, the application programs have been developed independently. Therefore, features for the human interface are also incorporated in such programs. Under such circumstances, the importance is necessarily put on the fulfillment of the functions requested by the application, and the human interface has often been treated as supplementary.

For example, the application is in full recognizance of all functional modules under its control and it operates by directly specifying these functional modules. In case a certain application is to be operated, it is necessary for the user to memorize the interface specific to the application. In other words, the conventional type computer has a machine-oriented architecture centered on a machine, and the common portion is cut off and brought out for the convenience of the machine.

In recent years, attention has been increasingly focused on UIMS (user interface management system). This has been conceived to offer the better environment for the users and to improve the quality because little time has been allocated for the manufacture of the user interface of the application programmer. The conventional multi-window or UIMS are based on the viewpoints that the user interface of the minimum quality can be prepared without spending much time by taking out the common portions from the existing application programs and making them as standard parts. The origin of this idea is not from the standpoint of the users but of the developer.

For example, when a certain application is to be operated as described above, the application has an interface of its own. For this reason, if the application is changed, the users must learn and undergo training. Not only in the case where the beginners buy a new computer, but also in the case where computer or software is changed to different ones, the user can rarely use it at first. When a new type of computer or new application software is announced, bulky manuals are offered, and the users cannot use the computer or software unless they learn and understand fully the description in such bulky manuals. Further, in almost all cases, the concept, functions and operating procedure of the application software are independent and different from each other, and it is exclusive and inconsistent. Therefore, the users must learn each different type of application software, and the learning efficiency is not very high. Moreover, for efficient utilization of a computer, it is necessary to learn functions and operating procedures and also to undergo physical training in key operation.

The interface of a computer is usually via a keyboard, mouse and CRT, and the direct manipulation using a mouse offers a considerably effective environment. However, there are some problems such as the inconveniences to input drawings, illustrations, etc.

SUMMARY OF THE INVENTION

It is an object of the invention to offer an architecture model of a human interface, by which it is possible to view operations in the same way, and to handle such operations by the same operating procedure at all times.

For this purpose, the architecture model according the present invention comprises a plurality of agents divided into independent component functions and performing processing in relation to human interface, and a studio for reading and writing various information as a shared medium, and it is characterized in that each of the agents can be started according to the status of the studio, that the user and each of the agents gain access to the studio, and that it is possible to perform processing in relation to a human interface through distributed cooperative processing by the user and a plurality of agents. Further, it is characterized in that a converter is provided between agents and studio to convert the expression form in the studio to that of the agents, and that a user information management unit is provided to control the information on a manager who controls the flow of information in the studio, or the user.

By the above arrangement, each of the agents can be started according to the status of the studio. Thus, adequate agents suitable for the attainment of the intervention of the user are started one after another. The user and each of the agents gain access to the studio and can perform processing in relation to a human interface through distributed cooperative processing by the user and a plurality of agents with the studio as a working space. Also, a converter is provided between the agents and the studio to convert the expression form in the studio to that of the agents, and this facilitates the assimilation of agents when a new agent is added. Further, a manager is provided, and it is possible to instruct the user when user intervention is needed and to achieve efficient intervention by the user. Because the user information management unit is provided, it is easier to individualize and to adapt to individual.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF PREFERRED EMBODIMENTS

Figure 1:
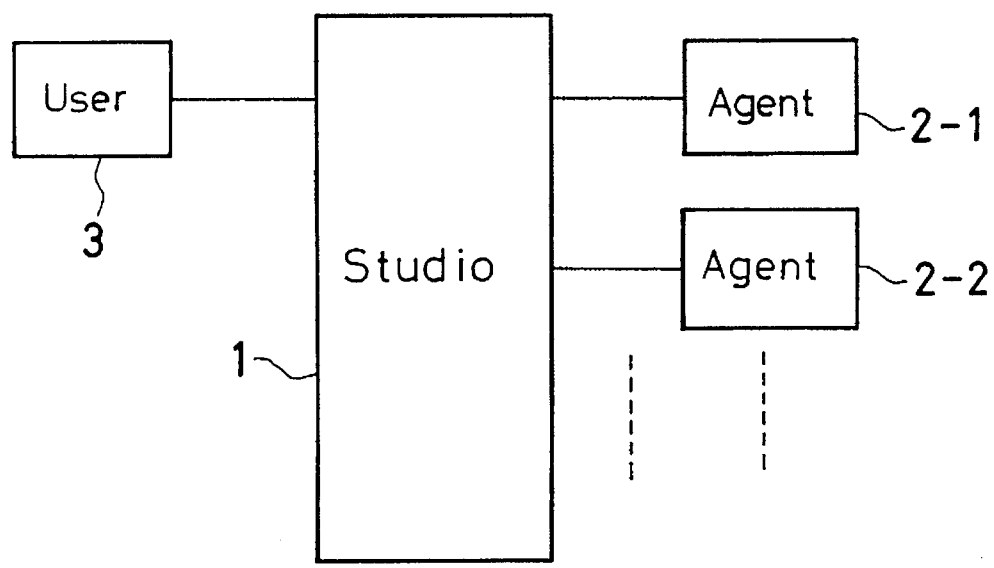
FIG. 1 is a diagram showing the arrangement of an embodiment of architecture model of human interface according to the present invention.

In FIG. 1, the agents 2-1, 2-2, . . . are basic modules divided into element functions and are in charge of for processing and information related to a human interface (the same meaning as the so-called user-interface or man-machine interface) for interaction between man and machine, and a plurality of agents corresponds to the metaphor indicating a utilization environment. Specifically, each agent is a functional module having independent features, and it refers to the information written in the studio 1; and starts according to the content of the information. Moreover, one or more agents are started for a single purpose. Accordingly, the agent is started not by explicit calling, and it is possible to replace an agent started executing a function by another agent. That is, the agents 2-1, 2-2, . . . are subjects for executing very diversified functions, and these subjects disperse and coordinate the functions to accomplish the purpose of the user.

The user 3 is also an agent. For example, it can write in the studio 1 through a converter, and look at the one required out of the contents. As described above, the agents in the present invention comprise an input processing module for writing into the studio 1 from the user, an output processing module for performing various processings to the information written in the studio 1, etc.

The studio 1 is to perform communication between the agents performing the above coordination, synchronization and sharing of internal data. It is a work memory area for reading and writing various types of information consisting of messages and data for interaction between the agents as a common medium to be accessed from each of the agents 2-1, 2-2, . . . , and for temporarily retaining the information.

The studio 1 is a shared medium to write and assemble various information. The result of the processing by agents are written in the studio 1, and these are referred to by the other agents. In so doing, the communication and synchronization are performed between agents. The information written in this studio 1 includes:

(1) The message to be exchanged between agents;
(2) The problem to be solved by agent group;
(3) The information about the user and interactive history with the user.

The media easily expressed by humans or the media vary according to the content of the information to be processed. Human beings try to understand the situations through the network of information relating to the partners or the objects nearby by information routes such as vision, hearing organs, etc. To express themselves, human beings use various forms of information such as words by voice or characters, pictures, graphics, voice quality such as emphasis or intonation, complexion, gesture, etc. The user thinks of the dialogue between people when they have interaction with computers, and a multimodal dialogue is desired also in the case of the dialogue between man and computer.

The information written in the studio 1 can be described in its form with different abstract degrees. In case the information is described by forms with different abstract degrees, it is possible to convert it if there is an agent to perform such conversion. Therefore, even when the input from the user is done by expression forms such as voice, text, etc., it is possible to cope with such situations. The same applies to the output to the user. Because conversion (media conversion) is performed between the forms with different abstract degrees, it is possible to produce output by different media and to perform multimodal dialogue as described above.

Next, description is given on the solution of the problem by coordinated operation of the agents.

The process of the system having interactive operation with the user to interpret the intention and to execute it is the process to "solve the problem". In general, it is necessary for solving a problem that a plurality of different functions and knowledge are operated in a coordinated manner. Also, it is impossible to determine the starting sequence of functions and required knowledge in advance. The architecture model according to the present invention makes it possible to perform the coordinated and dispersed processing.

(1) First, the problem and the state of the process to solve the problem in relation to a human interface are written in the studio, and this is accessible from any of the agent. This supports the coordinative operation by a plurality of agents.
(2) In the studio, the state at different position of a time series is described, and this makes it possible to "turn back" the operation.
(3) By setting an adequate agent, it is possible to explain the situation of solving a problem in an easily understandable manner.

Further, description is given on the other embodiments of the invention, in which a manager and a user information management unit are added.

Figure 2:
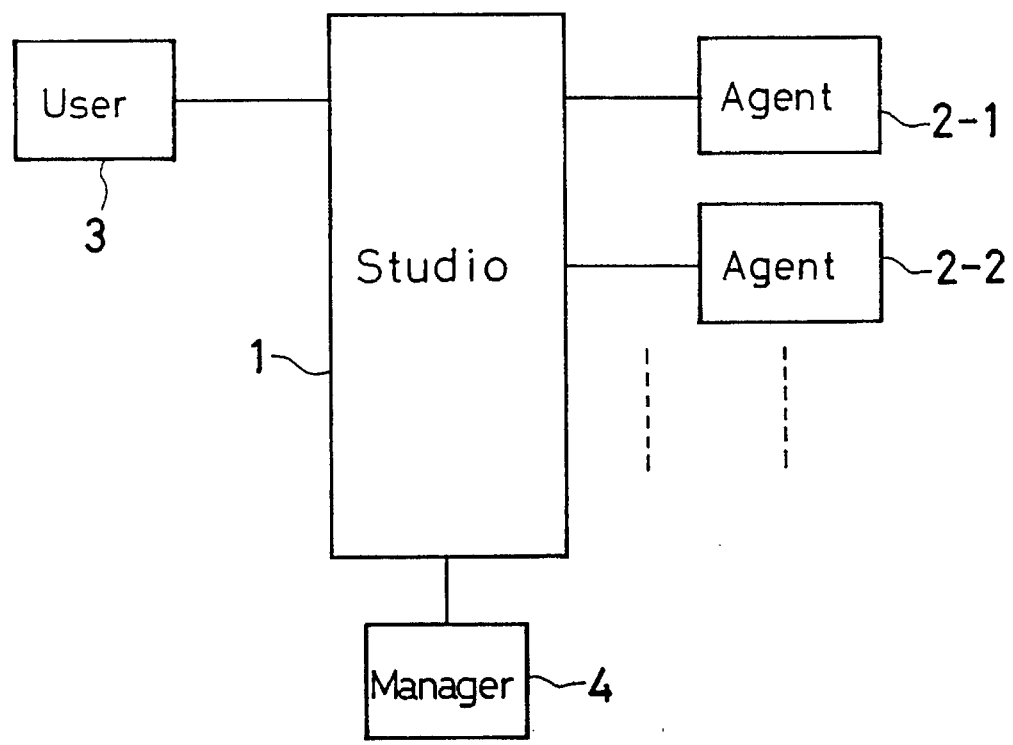
FIG. 2 shows the arrangement of an embodiment of architecture model of human interface provided with a manager according to the present invention.

FIG. 2 shows an embodiment of an architecture model of human interface provided with a manager according to the present invention.

The manager 4 monitors the message written in the studio 1, informs the status to the user when necessary, asks the judgment of the user when a problem arises in the operation of the agent and operates to solve the problem. The manager 4 is started in the following cases:

(1) In case there is no agent to be started in response to the message.
(2) In case a plurality of agents give the answers and it is necessary to select one.

Figure 3:
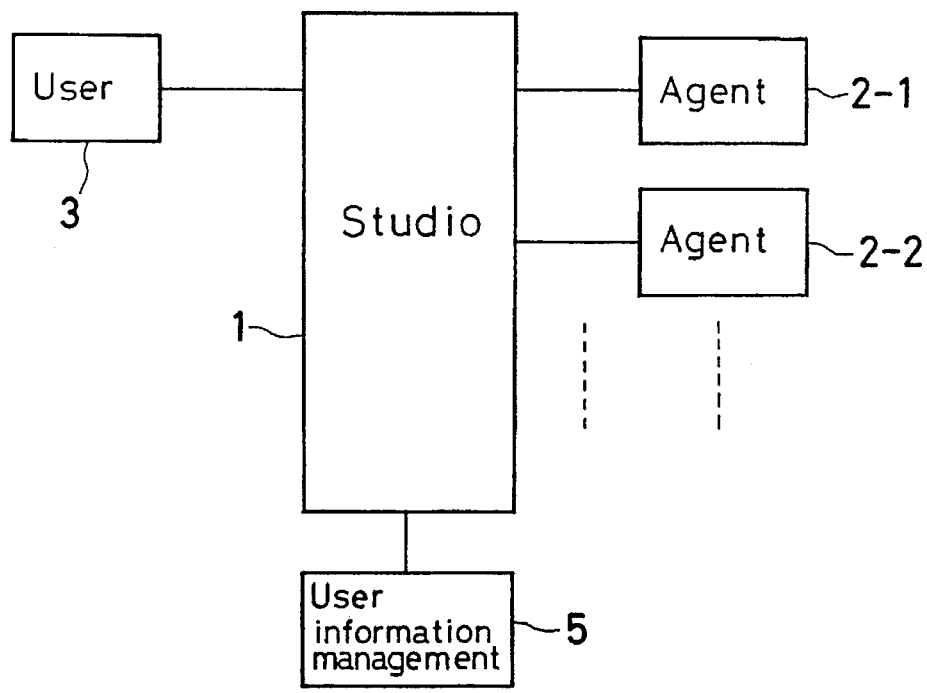
FIG. 3 shows the arrangement of an embodiment of architecture model of human interface provided with a user information management unit according to the present invention.

FIG. 3 shows an embodiment of an architecture model of human interface provided with a user information management unit according to the present invention.

The user information management unit 5 manages the information relating to the user himself, and the content of the information on the user is as follows:

(1) The parameters belonging to the users such as the degree of skill, level of knowledge, preference, etc.
(2) The estimated value from a mental model on the system by the user.

This is the estimation by the system from the behavior of the user as to how the user understands the system (mental model), and this is used for the prediction and the evaluation of the behavior of the user and individual adaptation by the system.

These contents can be referred from any of the agents, and the change is not limited to any specific agent. Therefore, this common user model plays an important role for the individualization of human interface (positive change of the system function and environment by the user) and for individual adaptation (observation of the behavior of the user by the system and the automatic and negative adaptation to the user according to such observation). Because the user model is common to all agents, individual adaptation can be performed efficiently and consistently. For example, from the received mail and the amount of such mail, the data base for the companionship of the user is obtained, and this is used to check the style of the letter for each receiver.

Thus, considering that the solution of the problem is to attain the intention of the user, the functions offered to the user by the system and the operating procedure cease to be rigid or stereotyped, and the operation can be performed by the procedure convenient for the user. As the result, the degree of freedom in the intellectual behavior of the user can be extensively increased.

Figure 4A:
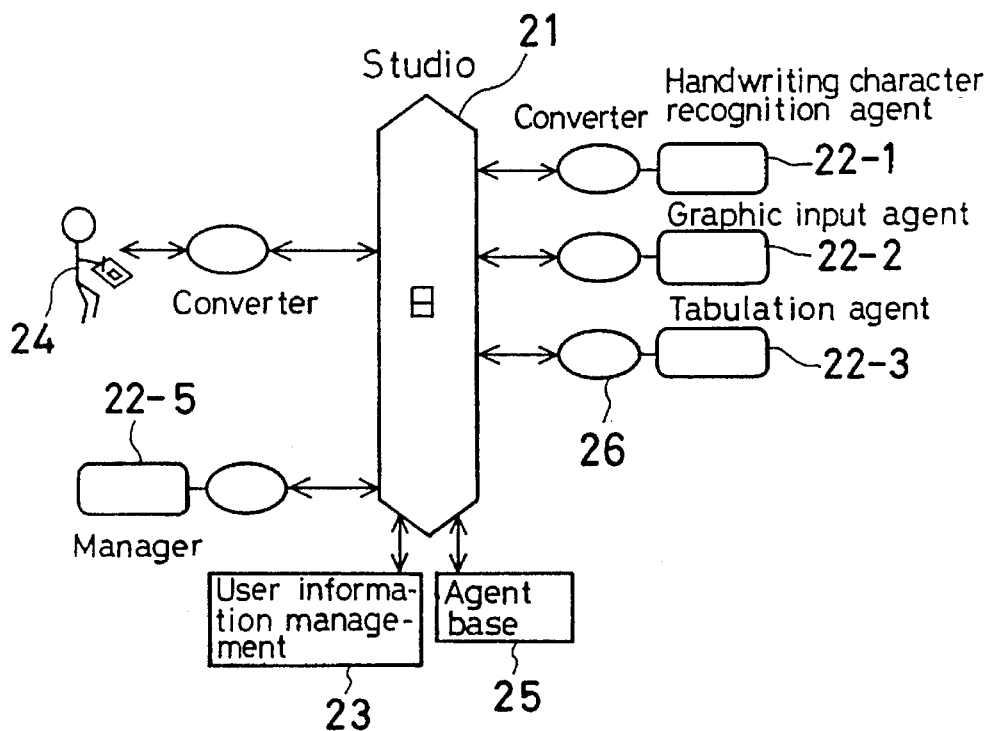
FIGS. 4(*a*) and 4(*b*) are diagrams to explain total operation of an agency model.
Figure 4B:
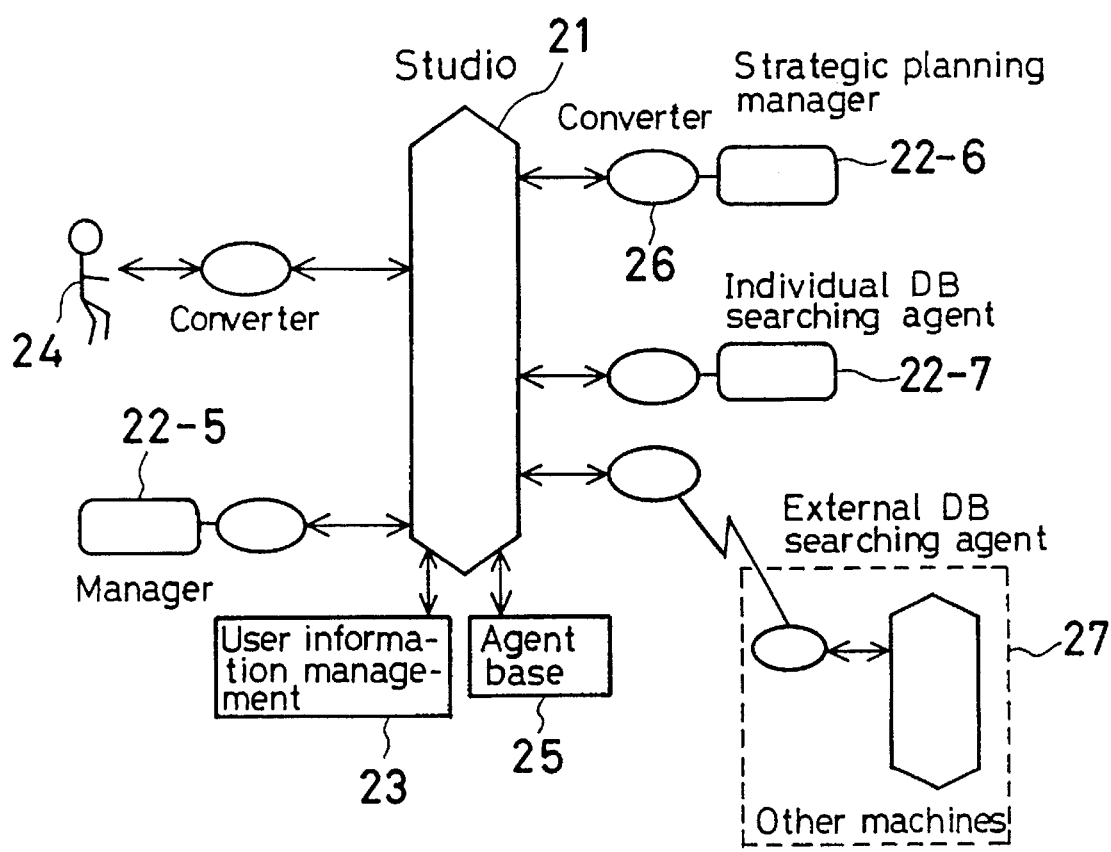

Next, description is given on concrete examples of the operation of the architecture model according to the present invention in connection with FIG. 4.

The coordinative dispersed processing by the architecture model of this invention can be classified according to the form of execution into: (1) User selection type, (2) parallel execution type, and (3) strategic planning type. The user selection is the type, in which the results of the processing as offered from several agents are presented to the user for choice and the user positively and sequentially performs processing through orientation. For example, when the user draws a line, the computer cannot judge whether it is a straight line, a part of a character, or a part of a graphic. The parallel execution type is the form of processing in which several agents are operated in parallel to estimate the intention of the user by the system, and a typical example is given in FIG. 4 (a). The strategic planning type is the form of processing, in which the strategic planning agents set up the strategy in order to solve the problem roughly presented by the user, dividing the problem into several sub-calls and presenting them to the other agents, and a typical example is given in FIG. 4 (b).

These forms of processing are not singly determined to a command or to the problem presentation of the user, but processing is done harmoniously depending upon the contents of processing and the situations.

First, description is given on the common arrangement in FIG. 4. Of the agents 22-1, 22-2, ..., the agents in starting status are directly connected to the studio 21, and the other agents are stored in the agent base 25. The agent base management agent has the intellectual searching function for the agents in the agent base 25. By this searching, the best suitable agent for the attainment of the intension of the user 24 is started. The converter 26 is present between the agents 22-1, 22-2, ... and the studio 21. It converts the expression form in the studio 21 to the expression form of the agents 22-1, 22-2, ..., and its presence facilitates the assimilation of the agents when new agents are added. Therefore, if two or more converters 26 are set between this and the user 24, the dialogue can be performed with the user 24 in two or more forms. The manager 22-5 makes adjustment when the adjustment between the agents is inachievable or when a problem arises in the dialogue during the interaction between the user 24 and the system. In the processing of the user selection type, the manager adjusts the indicated data to ask the user in the form of a menu and presents it to the user.

As an example of the parallel execution type, description is given on the case where the user 24 inputs "a" from the tablet as shown in FIG. 4 (a). This data is converted by the converter to the data format according to the expression rule of the studio 21 and is transferred to the studio 21. At this time point, it is not known whether the inputted data is a Chinese character "a", a graphic or a line forming a part of a table. Then, the handwriting character recognition agent 22-1, the graphic input agent 22-2 and the tabulation agent 22-3 take up the data and start the processing respectively. As the result, the handwriting character recognition agent 22-1 writes the character "a" on the studio 21. The graphic input agent 22-2 issues the stroke information, disassembling "a", and the tabulation agent 22-3 issues the message to the studio that the size is too small. In the agency model according to the invention, the agents are able to operate independently and perform the processing in parallel on a single data item.

Also, as described above, various data having different abstract degrees are written in the studio 21. To this, each of the agents takes up the data which it can process for each processing unit and processes it. In this case, the processing is performed just like on a pipeline.

Next, description is given on an example of the strategic planning type, in which the user 24 issues a rough question such as: "I want to know the changes in the sales of personal computers." When processing is performed without directly processing the target as in this case, the strategic planning agent 22-6 sets up strategic procedure as shown in FIG. 4 (b) to solve the problem such as: "to search at first in individual DB (data base)", or if sufficient data is not obtained, "to search external DB". Then, the strategic planning type processing method is taken, and the procedure is instructed to individual DB search agent 22-7 and external DB search agent 27 through the studio 21. At the same time, the operating manager 22-5 detects the ambiguous point of the question and reports it to the studio 21. Further, the strategic planning agent 22-6 feels the need to consider the cost and determines the method to find the searching condition to the external DB searching agent 27.

Thus, the agents are basically divided into component functions. A plurality of agents engage with a single function, and a plurality of agents are started to attain a single purpose. In other words, the architecture model of this invention is operated for the attainment of a sole purpose through coordinated operation of a plurality of agents.

As it is evident from the above description, agents are prepared for each function according to the present invention and a plurality of agents work under coordinated operation. There is no restriction on the starting sequence. Accordingly, the adding of new agents or a change in combination of such agents can be easily performed. Also, each of the agents is an independent module with defined characteristics description. When an agent is newly added, the newly added agent changes the converter by this description and can assimilate with the existing agent group. With the studio as a shared medium, each of the agents can function independently and forms consistent human interface to the starting of different agents. This contributes to the structural consistency of the system image. By emphasizing the need of the intervention of the user, more efficient intervention of the user is assured. Moreover, because the information relating to the user is controlled by the user information management unit, data can be watched and processed by the same procedure at all times, and this eliminates the problem of skill or maneuverability.

What we claim is:

1. An information processing system, comprising:

a plurality of function modules, each divided into element functions each having independent features; each of said plurality of function modules recognizing information presented by a user independently and directly, each of said plurality of function modules responding to content of said information, and each of said plurality of function modules executing processing using said information presented by the user;

a work memory area being a shared medium accessible from said plurality of function modules and for reading and writing information including messages for executing interaction by ones of said plurality of function modules, the information in said work memory area including problems to be solved by ones of said plurality of function modules, and the information in said work memory area including information relating to the user as well as an interactive history with the user constituting historical records of interaction between the user and each of said plurality of function modules;

a control module for monitoring content of said information written in said work memory area and for updating ones of said plurality of function modules, whereby:

said control module includes a user information control module;

said user information control module accumulates and controls parameters pertaining to the user including skill, knowledge level, and personal preferences specified by the user, and said user information control module accumulates and controls information from said historical records of interaction between the user and each of said plurality of function modules pertaining to expertise of the user; and said parameters and said information pertaining to expertise of the user are referred to by each of said plurality of function modules; and said control module executes coordinated processing and dispersed processing of information by the user and each of said plurality of function modules to said work memory area.

2. An information processing system according to claim 1, further comprising a converter for converting a first information format used in the work memory area and a second information format used by one of said plurality of function modules, to enable communication between said one of said plurality of function modules and said work memory area.

3. An information processing system according to claim 1, wherein said control module includes a manager module, which monitors said information written in said work memory area, and wherein said control module presents information to notify a status to the user in case such a status occurs where there is no function module which can respond to the information written in said work memory area or in case a status occurs where it is necessary for the user to select from among different information from the information respectively issued from ones of said plurality of function modules; and said manager module makes adjustment for processing said status according to the information presented by the user, who has been given said different information to respond to said status.

* * * * *